US012755506B2

(12) United States Patent
Hassbring et al.

(10) Patent No.: US 12,755,506 B2
(45) Date of Patent: Oct. 6, 2026

(54) METHOD AND SYSTEM FOR CALIBRATION OF DETECTION THRESHOLDS IN VIDEO OBJECT DETECTION

(71) Applicant: Axis AB, Lund (SE)

(72) Inventors: Ludvig Hassbring, Lund (SE); Mikael Murstam, Lund (SE); Joakim Ericson, Lund (SE)

(73) Assignee: Axis AB, Lund (SE)

( * ) Notice: Subject to any disclaimer, the term of this patent is extended or adjusted under 35 U.S.C. 154(b) by 3 days.

(21) Appl. No.: 19/045,943

(22) Filed: Feb. 5, 2025

(65) Prior Publication Data

US 2025/0259410 A1 Aug. 14, 2025

(30) Foreign Application Priority Data

Feb. 9, 2024 (EP) .................................... 24156775

(51) Int. Cl.
*G06V 10/25* (2022.01)
*G06T 7/12* (2017.01)
(Continued)

(52) U.S. Cl.
CPC ................ *G06V 10/25* (2022.01); *G06T 7/12* (2017.01); *G06T 7/20* (2013.01); *G06V 10/764* (2022.01); *G06V 2201/07* (2022.01)

(58) Field of Classification Search
CPC .. G06V 10/25; G06V 10/764; G06V 2201/07; G06V 10/26; G06V 10/62;
(Continued)

(56) References Cited

U.S. PATENT DOCUMENTS 7,227,893 B1 * 6/2007 Srinivasa ......... G08B 13/19602 348/169
10,104,361 B2 * 10/2018 Budagavi ............... H04N 19/46
(Continued)

FOREIGN PATENT DOCUMENTS

WO 2019/109722 A1 6/2019

OTHER PUBLICATIONS

Wenkel et al., Confidence Score: The Forgotten Dimension of Object Detection Performance Evaluation, Sensors 21, No. 13: 4350, pp. 1-21 (2021).

(Continued)

*Primary Examiner* — Mia M Thomas
(74) *Attorney, Agent, or Firm* — Volpe Koenig

(57) ABSTRACT

A method for detecting objects in a scene comprises capturing video of the scene, segmenting a first image in into first and second scene areas whereby detection conditions are expected to differ between the scene areas. A first object detection threshold is set for the first scene area. A first object in the first image is detected, a first confidence value for the detection of the first object being above the first object detection threshold. In a plurality of images subsequent to the first image, the first object is tracked as it moves into the second scene area. A second confidence value for a detection of the first object in the second scene area is determined. A second object detection threshold for the second scene area is set such that the second confidence value is above the second object detection threshold.

10 Claims, 7 Drawing Sheets

(51) Int. Cl.
*G06T 7/20* (2017.01)
*G06V 10/764* (2022.01)

(58) Field of Classification Search
CPC ...... G06V 10/776; G06V 20/70; G06V 20/52; G06T 7/12; G06T 7/20
See application file for complete search history.

(56) References Cited

U.S. PATENT DOCUMENTS

| | | | | |
|---|---|---|---|---|
| 12,309,522 | B2 * | 5/2025 | Hassbring | G06V 20/52 |
| 12,462,609 | B1 * | 11/2025 | Ding | G06V 10/26 |
| 12,494,063 | B2 * | 12/2025 | Xiong | G06V 20/52 |
| 2007/0263899 | A1 | 11/2007 | Garoutte | |
| 2013/0265382 | A1 * | 10/2013 | Guleryuz | G06T 11/60 348/14.08 |
| 2017/0024858 | A1 * | 1/2017 | St. Clair | G06V 20/40 |
| 2018/0286075 | A1 | 10/2018 | Jones et al. | |
| 2019/0057507 | A1 | 2/2019 | El-Khamy et al. | |
| 2020/0193407 | A1 * | 6/2020 | Costello | G06Q 20/40155 |
| 2020/0234056 | A1 * | 7/2020 | Pricochi | G06Q 30/0609 |
| 2021/0280027 | A1 * | 9/2021 | Wen | G06N 3/0464 |
| 2022/0189265 | A1 * | 6/2022 | Yamazaki | G07G 1/0054 |
| 2022/0222644 | A1 * | 7/2022 | Okamura | G06Q 20/4016 |
| 2023/0177661 | A1 * | 6/2023 | Ericson | H04N 7/18 |
| 2023/0410352 | A1 | 12/2023 | Hassbring et al. | |
| 2024/0005460 | A1 * | 1/2024 | Ericson | G06V 20/52 |
| 2024/0193993 | A1 * | 6/2024 | Ishida | G06Q 20/206 |
| 2024/0355021 | A1 * | 10/2024 | Hassbring | G06T 7/194 |
| 2025/0111466 | A1 * | 4/2025 | Yuan | G06T 1/20 |
| 2025/0157003 | A1 * | 5/2025 | Murstam | G06T 7/11 |
| 2025/0391148 | A1 * | 12/2025 | Murstam | G06V 10/26 |
| 2026/0037949 | A1 * | 2/2026 | Ishida | G06Q 20/208 |

OTHER PUBLICATIONS

European Search Report, European Patent Application No. 24156775.9, dated Jun. 20, 2024.

* cited by examiner

METHOD AND SYSTEM FOR CALIBRATION OF DETECTION THRESHOLDS IN VIDEO OBJECT DETECTION

TECHNICAL FIELD

The present invention relates to the field of video object detection, and more precisely to how to set detection thresholds in video object detection.

BACKGROUND

It is known to detect objects of various kinds in video, e.g., in monitoring or surveillance scenarios. Object detections may be used for different use cases, such as for privacy masking or for people counting.

In privacy masking, it is important not to miss any objects that should be masked, i.e. false negatives should be avoided in the object detection process. For instance, faces or whole bodies of people may need to be masked out, such that people cannot be identified. Another example is license plates, that may need to be masked out in order to prevent indirect identification of vehicle owners. False positives may in such situations be more tolerable than false negatives. Still, false positives may make the monitored scene difficult to understand if too many unnecessary objects are masked out.

In people counting, on the other hand, it may be important not to overcount, i.e. false positives should be avoided in the object detection process. Overcounting could, for example, deter potential customers from visiting a store if visitor data falsely indicates the store is crowded, or result in unnecessarily high power consumption in occupancy regulated HVAC systems. There are also counting scenarios in which it is important to avoid false negatives. If, for instance, people counting is done for compliance with fire safety regulations, to ensure that a room or a building is not occupied by too many people, it is important not to undercount.

Object detectors or object detector algorithms are well known and may be implemented in different ways. Today, many object detection algorithms use machine learning or deep learning and may, e.g., employ neural networks. Other object detection algorithms are based on feature detection. Examples of such feature detection-based algorithms are the Viola-Jones object detection framework, which is based on Haar features, scale-invariant feature transform (SIFT) algorithms, and histogram of oriented gradients (HOG) feature algorithms.

For balancing the risk of false negatives and false positives, object detection algorithms generally employ thresholds. When a neural network object detector finds object candidates in an image, these candidates are each associated with confidence values that indicate how sure or likely the detection is. The confidence value may be applicable on a per pixel basis or on a per area or bounding box basis, depending on the object detector that is being used. A detection threshold is set such that only detection candidates with a confidence value above the threshold are output as object detections. Such thresholds can also be used for determining which detected objects should be masked in a scenario where object detection is used for privacy masking. The detection thresholds may be used for object detection, i.e. the task of detecting if there is any object in an image or in a location in an image, as well as for classification, i.e. the task of detecting if there is an object of a particular object class in an image or in a location in an image.

Setting the detection thresholds is not an easy task. They need to be set high enough to limit the number of false positives and at the same time low enough to limit the number of false negatives. Furthermore, it may be necessary to set the thresholds differently for different parts of the scene as detection conditions may differ from one area to another, making it more difficult to confidently detect objects in some areas.

There is therefore a need for methods and systems that make it easier to set detection thresholds for object detection.

SUMMARY OF THE INVENTION

It is an object of the present invention to provide an object detection method that lessens the difficulty in setting detection thresholds. It is also an object of the invention to provide an object detection system that enables convenient and efficient setting of detection thresholds for object detection. Further objects of the invention are to provide a camera and a computer-readable storage medium which make it possible to perform object detection with simplified setting of object detection thresholds.

The invention is defined in the independent claims, with embodiments defined in the dependent claims.

Thus, according to a first aspect, the abovementioned objects are achieved, in full or at least in part, by a method for detecting objects in a scene captured by a camera, the method comprising: capturing video of the scene, segmenting a first image in the video into at least a first scene area and a second scene area, the first and second scene areas having properties such that object detection conditions are expected to differ between the first and second scene areas, setting a first object detection threshold for the first scene area, detecting a first object in the first scene area in the first image, a first confidence value for the detection of the first object being above the first object detection threshold, in a plurality of images subsequent to the first image, tracking the first object as it moves into the second scene area, determining a second confidence value for a detection of the first object in the second scene area, setting a second object detection threshold for the second scene area such that the second confidence value for the detection of the first object is above the second object detection threshold, and in subsequent images, using the first object detection threshold for detecting objects in the first scene area and the second object detection threshold for detecting objects in the second scene area. In this manner, it is possible to adapt object detection thresholds to the conditions in the scene. Detection conditions in the scene may differ from one scene area to another, such that a uniform detection threshold would lead to too many false positives in some scene areas if set too low and too many false negatives if set too high. An attempt at compromising, setting an intermediate detection threshold might lead to both too many false positives in some areas and too many false negatives in other areas. By tracking the first object as it moves from the first scene area to the second scene area, it is possible to adapt the detection threshold used in the second scene area such that it can be ensured that detections are made also in the second scene area, even if detection conditions are more difficult in the second scene area. As an example, if the same detection threshold had been used in the second scene area as was used in the first scene area, this first object detection threshold might be too high for the second scene area because detection conditions are less favourable there. Unfavourable object detection conditions may, e.g., be caused by reduced visibility, such as if the second scene area is in shadow or if there are glaring lights. Reduced visibility may also be caused by fog, rain, or frosted glass, or by objects being partially immersed in water or partially obscured by foliage. Because the first object is tracked into the second scene area, it is known that the object is there, even if a too high object detection threshold has been set globally for the scene. Thereby, it becomes possible to set a second object detection threshold for the second scene area, such that the first object would be detected also there. The second object detection threshold is therefore set such that that the second confidence value for the detection of the first object is above the second object detection threshold. Suitable object detection thresholds may with this approach be set for different scene parts having different object detection conditions, such that acceptable rates of false positives and false negatives can be ensured.

As used herein, the term "object detection" refers both to a generic detection of objects, i.e. determining if there is an object in the image, and to more specific object detection or classification, such as people detection or vehicle detection, i.e. determining if there is an object of a particular object class in the image. The specific object detectors or classifiers may operate according to different principles. Some classifiers work according to a "detect first, classify later" principle, where an object will first be detected and only then will the object class of the detected object be detected. The output of such classifiers will generally be a single object class per detected object. Other classifiers directly classify possible objects, outputting probabilities for each of a number of object classes for each pixel or object. For instance, such a "direct classifier" may output the result that the likelihood that a particular pixel is part of a person is X % and that the likelihood that it is part of a vehicle is Y %. Depending on what thresholds are used for the different object classes in the given scenario, the user may be presented with the result that there is a person or a vehicle or no object of interest at all.

In line with this, the term "confidence value" is herein used to refer to a confidence value of a general object detector as well as to a confidence value of a classifier. In other words, the confidence value of an object detection may signify the likelihood that there is an object in a location in the image or the likelihood that there is an object of a particular object class.

The first object may be associated with a first object class. Setting the first object detection threshold for the first scene area may comprise setting a first object detection threshold for objects of the first object class in the first scene area, and setting the second object detection threshold comprises setting a second object detection threshold for objects of the first object class in the second scene area. Thus, the first and second object detection thresholds may be adapted to objects of the first object class.

The method may further comprise setting a third object detection threshold for detecting objects of a second object class in the first scene area, detecting a second object in the first scene area in a second image, wherein the second object is associated with a second object class and a wherein a third confidence value for the detection of the second object is above the third object detection threshold, in a plurality of images subsequent to the first image, tracking the second object as it moves into the second scene area, determining a fourth confidence value for a detection of the second object in the second scene area, setting a fourth object detection threshold for the second scene area such that the fourth confidence value for the detection of the second object is above the fourth object detection threshold, and in subsequent images, using the first object detection threshold for detecting objects of the first object class in the first scene area and the second object detection threshold for detecting objects of the first object class in the second scene area, and using the third object detection threshold for detecting objects of the second object class in the first scene area and the fourth object detection threshold for detecting objects of the second object class in the second scene area. In this way, it is possible to set suitable object detection thresholds for objects of different object classes. It may be noted that object detection conditions need not necessarily be the same for objects of all object classes even if they are in the same scene area. For instance, boats may be easy to detect on water, whereas people swimming in the same scene area may be more difficult to detect than they would have been if walking on land.

In some variants, the method further comprises performing a new segmentation of a later image subsequent to the first image based on a trigger event. This may be useful if detection conditions in the scene change. Such change may be predictable, such as when a scene becomes darkened by a shadow of a building at around the same time each day. Detection condition change may also be more unpredictable, such as when a scene area becomes filled with steam suddenly released from a machine. Some changes may be of a more gradual and long-term nature, such as when leaves in a sparse foliage grow in spring and fall off in autumn. The trigger event may be based on automatic detection, such as detection of lighting conditions in the scene. In other scenarios, the trigger event may be based on a timer or user input, such that a new segmentation is performed at regular or irregular intervals in order to make sure that the detection conditions in the different scene areas do not change to such an extent that the object detection thresholds become outdated.

Similarly, the method may further comprise performing a new tracking of a later object in images subsequent to the first image based on a trigger event, determining an updated second confidence value for a detection of the later object in the second scene area, setting an updated second object detection threshold for the second scene area such that the updated second confidence value for the detection of the later object is above the updated second object detection threshold, and in images subsequent to the later image, using the first object detection threshold for detecting objects in the first scene area and the updated second object detection threshold for detecting objects in the second scene area. This approach makes it possible to adapt the object detection thresholds to changing detection conditions in the scene.

The trigger event may be one of user input, an elapsed time since the second object detection threshold was set, a frequency of object detections in the first or second scene area deviating from a historical range, a time of day, a time of year, or a change in lighting conditions in the scene. This makes it possible to adapt the segmentation and the object detection thresholds to various causes of changes in detection conditions. For instance, if the number of object detections in a scene area falls significantly, compared to what has historically been the case, this could indicate that object detection conditions have changed and that a new segmentation and a new setting of object detection thresholds are needed.

The step of segmenting may be performed using a semantic segmentation algorithm or neural network. This may be an efficient way of segmenting the scene into different scene areas.

According to a second aspect, the above-mentioned objects are achieved, in full or at least in part by an object detection system for detecting objects in a scene captured by a camera, the system comprising circuitry configured to perform a capturing function arranged to capture video of the scene, a segmenting function arranged to segment a first image in the video into at least a first scene area and a second scene area, the first and second scene areas having properties such that object detection conditions are expected to differ between the first and second scene areas, a threshold setting function arranged to set thresholds for object detections in images in the video, an object detection function arranged to detect objects in images in the video, a confidence value determination function arranged to determine confidence values for object detections, and an object tracking function arranged to track objects in images in the video. The threshold setting function is arranged to set a first object detection threshold for the first scene area. The object detection function is arranged to detect a first object in the first scene area in the first image, a first confidence value for the detection of the first object being above the first object detection threshold. The object tracking function is arranged to track the first object in a plurality of images subsequent to the first image, as it moves into the second scene area. The confidence value determination function is arranged to determine a second confidence value for a detection of the first object in the second scene area. The threshold setting function is arranged to set a second object detection threshold for the second scene area such that the second confidence value for the detection of the first object is above the second object detection threshold. The object detection function is arranged to use the first object detection threshold for detecting objects in the first scene area and the second object detection threshold for detecting objects in the second scene area in subsequent images.

In some embodiments of the system, the object detection function is arranged to determine an object class of detected objects, the first object being associated with a first object class. In such embodiments, the threshold detection function is arranged to set the first object detection threshold for objects of the first object class in the first scene area, and to set the second object detection threshold for objects of the first object class in the second scene area.

According to a third aspect, the above-mentioned objects are achieved, in full or at least in part, by a camera comprising an object detection system according to the second aspect. Such a camera allows convenient object detection with simplified setting of suitable detection thresholds.

According to a fourth aspect, the above-mentioned objects are achieved, in full or at least in part, by a computer-readable storage medium comprising instructions which, when executed by a device with processing capability, cause the device to carry out the method of the first aspect.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

The invention will now be described in more detail by way of example and with reference to the accompanying schematic drawings, in which.

DETAILED DESCRIPTION OF EMBODIMENTS

Figure 1:
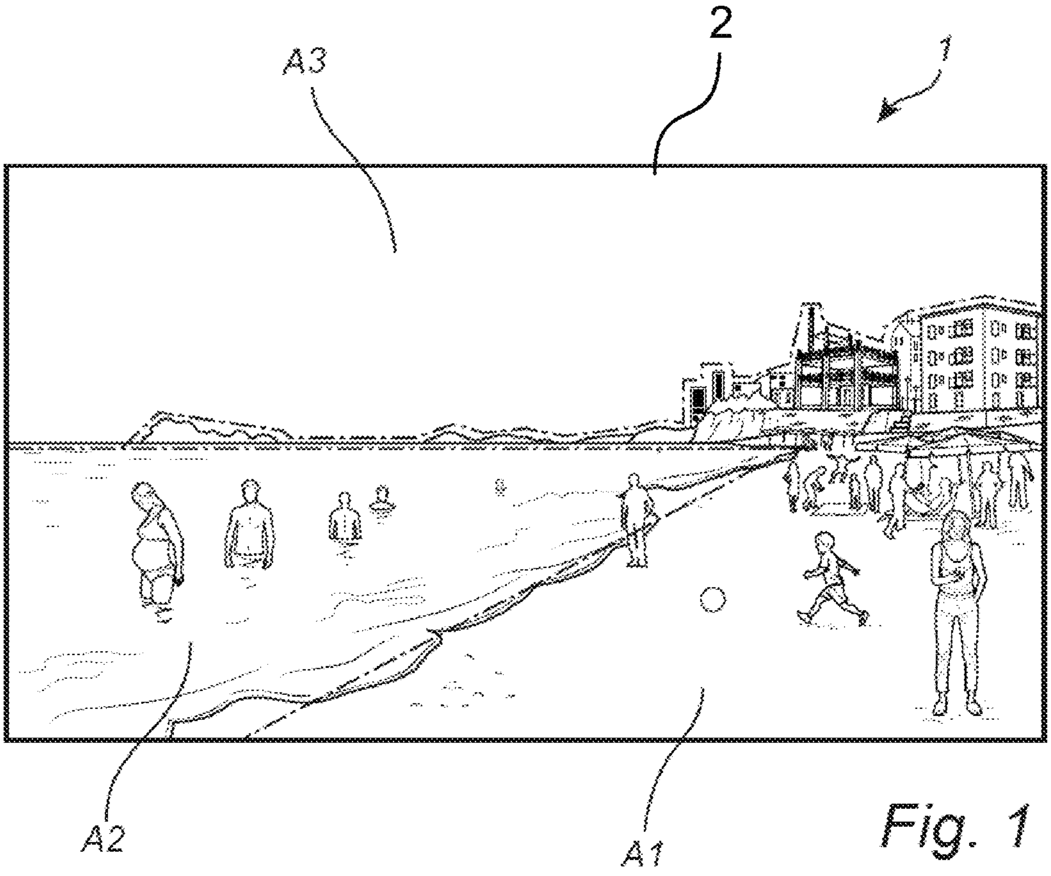
FIG. 1 is an illustration of an image of a scene.

FIG. 1 shows an image 1 of a scene 2. This scene 2 contains a beach, with an area of land, an area of sea, and some buildings in the distance. There are people on the beach, as well as other objects, such as a ball and a parasol. There may be a need to detect people and other objects in the scene. This need may be related to privacy issues, such as a desire or obligation to mask out identifiable or recognisable persons. The need to detect objects in the scene may also be related to security or safety issues. For instance, it may be of interest to detect if a person or other object enters a part of the scene where they are not allowed to be or where they would be at risk of injury. As an example, at times there are too strong currents in the sea for bathing or swimming to be safe, such that it is important to detect people in the sea in order to warn them or rescue them. As another example, cars may not be allowed to be driven on the beach, such that it is important to detect cars in order to stop them or warn people on the beach.

The image 1 in FIG. 1 has been segmented into three different scene areas, namely a land area A1, a sea area A2, and a sky area A3. In FIG. 1, the scene areas A1, A2, A3 are delimited by dash-dotted lines. The segmentation may be performed using a semantic segmentation neural network or algorithm, such as a Gaussian mixture model. The segmentation is done in view of expected differences in object detection conditions. The properties of the different scene areas A1, A2, A3 are different and these differences in properties lead to differences in the ease or difficulty of detecting objects. For example, an object detector may have been trained to detect people and may have no difficulty detecting people on land, such as in the land area A1, where they are generally clearly visible. However, a person in the water, such as the sea area A2, may be more difficult to detect, because only an upper part of the body is clearly visible above the water, whereas a lower part of the body is partially obscured or distorted by the water, even if the water is clear. In the sky area A3, it might be easy to detect a person, but it is highly unlikely that a person actually appears there. Depending on the reason for detecting people or other objects, it may be important to avoid false positives or false negatives in such an unlikely detection area as the sky area A3.

If the same detection threshold were to be used for the entire scene 2, there would be a risk of false positives, false negatives, or both. If the object detection threshold is set such that it is suitable for the land area A1, the object detection threshold would likely be too high for the sea area A2, such that a lot of people in the water would go undetected. If, on the other hand, the object detection threshold is set such that it is suitable for the sea area A2, the object detection threshold would likely be too low for the land area A1, leading to false positives, i.e. that image areas that do not contain people are identified as containing people. For instance, toys or parasols could be falsely detected as people. No matter which of the land area A1 and the sea area A2 the object detection threshold is optimised for, it could be wrong for the sky area. In the sky area A3, it may be desired to ignore all objects except for very confidently detected objects, because objects of interest are very unlikely to appear there, and false alarms caused by birds should be avoided. In other scenarios, it may be very important to detect if an object appears in this unlikely area, and it may therefore be desired to detect any object of a particular class, such as a person, even if the object detection has a very low confidence value.

In order to meet these conflicting needs, it would be useful to set different object detection thresholds for the different scene areas A1, A2, and A3. For an unlikely detection area, such as the sky area A3, this might be quite straightforward. If it is important not to miss any objects in the sky area, the detection threshold may be set low enough to ensure that even clouds or birds vaguely resembling an object of interest are detected. If objects in the sky are of no interest at all, the object detection threshold may be set high enough that only a detection with a confidence value of 100% would be output as an actual detection. For the land area A1 and sea area A2, it may be more difficult to set suitable object detection thresholds. One approach would be trial and error, with a user supervising the object detections for an extended period of time. This would be tedious and costly. The inventors have come up with an approach that makes the setting of object detection thresholds more convenient and that can be performed automatically.

Figure 2A:
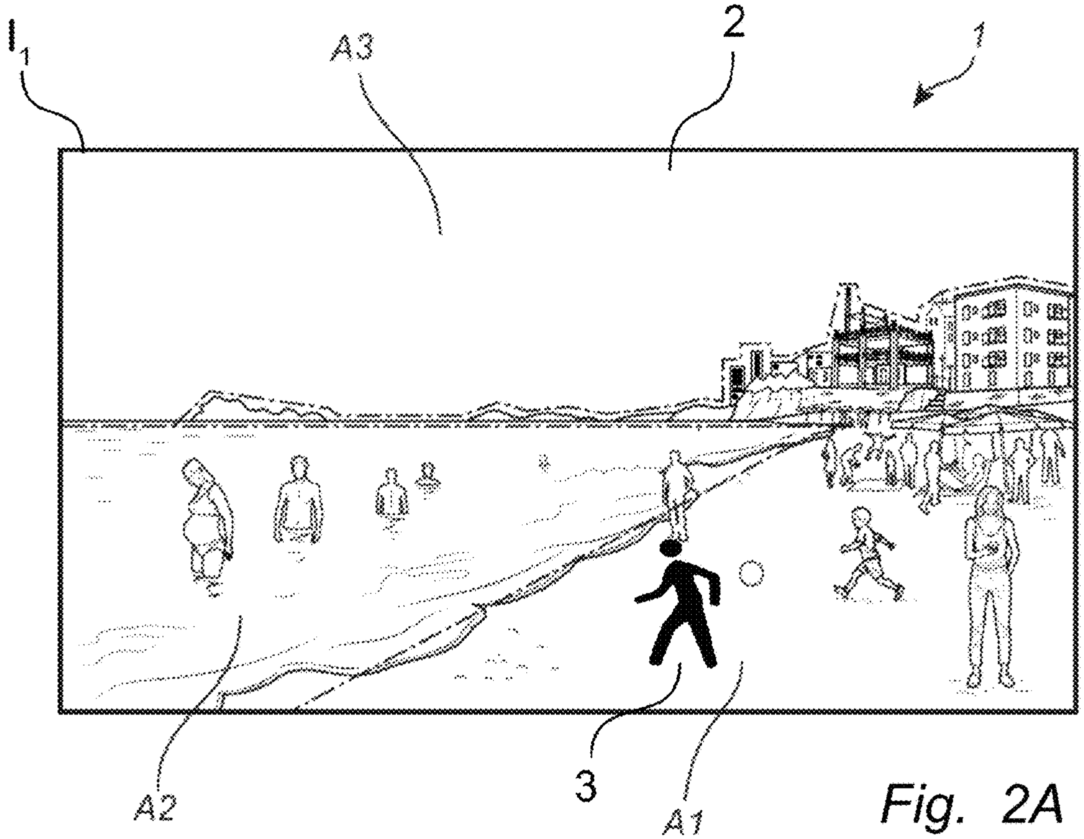
FIG. 2A is an illustration of a first image of the scene in FIG. 1, indicating a detected person on a beach.
Figure 2B:
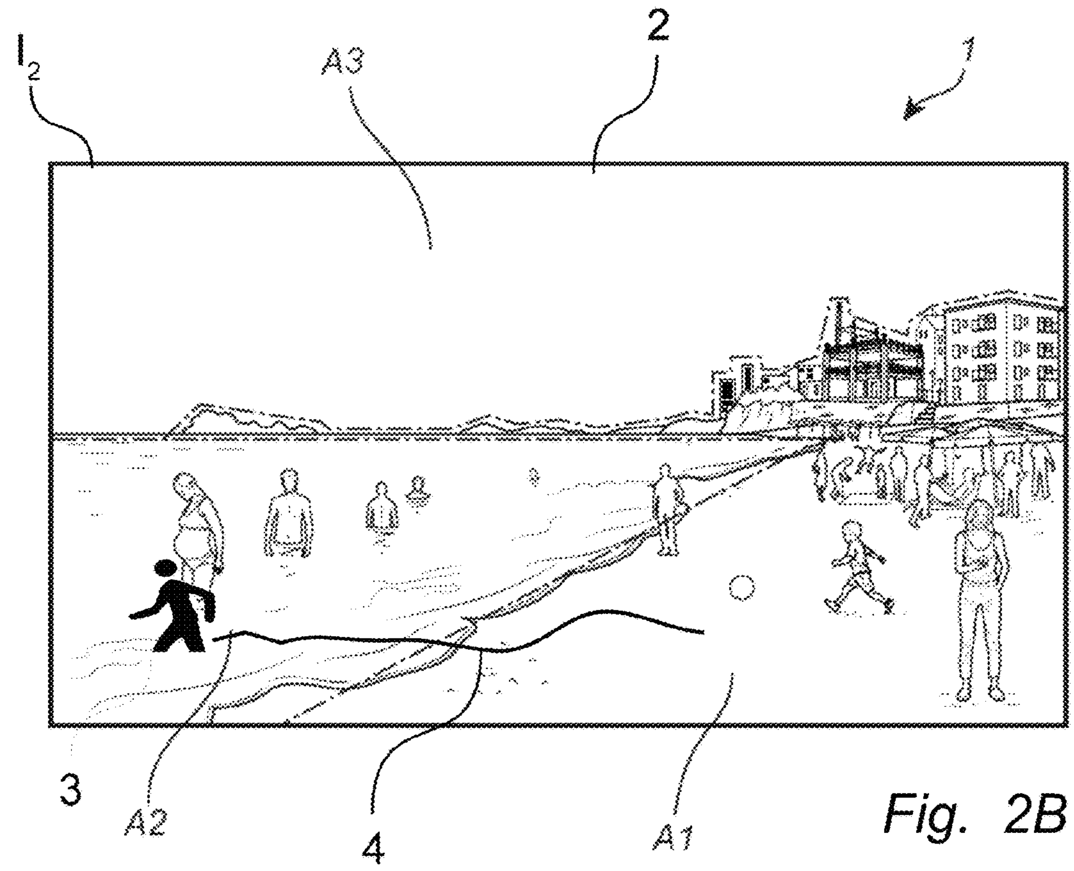
FIG. 2B is an illustration of a second image of the scene in FIG. 1, wherein the detected person has moved into the water.

The improved approach to setting detection thresholds for object detection will now be explained with reference to FIGS. 2A and 2B. FIG. 2A shows a first image I1 of the same scene 2 as shown in FIG. 1. The first image I1 has been segmented into three scene areas A1, A2, A3 in the same way as described in relation to FIG. 1. Object detection can be done using any suitable object detector, such as a neural network object detector based, e.g., on a convolutional neural network or a transformer. A first object detection threshold Th1A1 is set for the first scene area A1, i.e. the land area A1. This first object detection threshold Th1A1 may be a default detection threshold, and it may be set automatically or manually. The first object detection threshold may have been adjusted from a default object detection threshold after a short time of supervised use of the object detection system. A first object 3, in the form of a person, is detected in the land area A1, which may be considered a scene area with good object detection conditions. The detection of the person 3 has a first confidence value which is above the first object detection threshold Th1A1 for the first scene area, which means that the object detection algorithm is sufficiently confident that this is a person for it to be output as an object detection. Further images of the scene 2 are captured subsequent to the first image I1. FIG. 2B shows a second image I2, which has been captured a number of images after the first image I1. It may here be seen that the detected person 3 has moved into the water, i.e. into the second scene area or sea area A2. In images subsequent to the first image I1, the person 3 is tracked as the person 3 moves into the sea area A2. Tracking can be performed using any suitable tracking algorithm, such as a Kalman tracker. As an alternative to such video analytics-based trackers, an additional sensor, such as a radar sensor or lidar sensor could be used for tracking. The tracking is in FIG. 2B symbolised by a squiggly line 4, indicating how the person 3 has moved from where it was in the first image I1, through the subsequent images (not shown), up to the second image I2. Through this tracking, even if an object detection threshold for the sea area A2 has initially possibly been set too high, such that the person 3 would not have been detected, tracking in images subsequent to the first image I1, in which the person 3 was detected, makes it possible to determine that the person 3 is present in the sea area A2 in the second image I2. A second object detection threshold Th2A2 for the sea area A2 can now be set by studying a second confidence value C2 for an attempted object detection in the location of the person 3 in the second image I2. Because the person 3 has been tracked as it has moved from where it was detected in the land area A1 in the first image I1 into the sea area A2, it can be determined that the person 3 is in the sea area A2 in the second image I2, even if the second confidence value C2 is below the first object detection threshold Th1A1 set for the land area or any other object detection threshold initially set for the sea area A2. The tracking can thus be seen as a ground truth for the object detection. The second object detection threshold Th2A2 can now be set such that it is below the second confidence value C2. Thereby, the person will be detected by the object detector and output as an object detection. Taking into account whether avoiding false positives or false negatives is more important for the scenario, the second object detection threshold Th2A2 for the sea area A2 can be set with a smaller or larger margin below the second confidence value C2. Once the second object detection threshold Th2A2 for the sea area has been set, object detection in images subsequent to the second image I2 is performed using the first object detection threshold Th1A1 for detecting objects in the land area A1 and the second object detection threshold Th2A2 for detecting objects in the sea area A2.

Figure 3A:
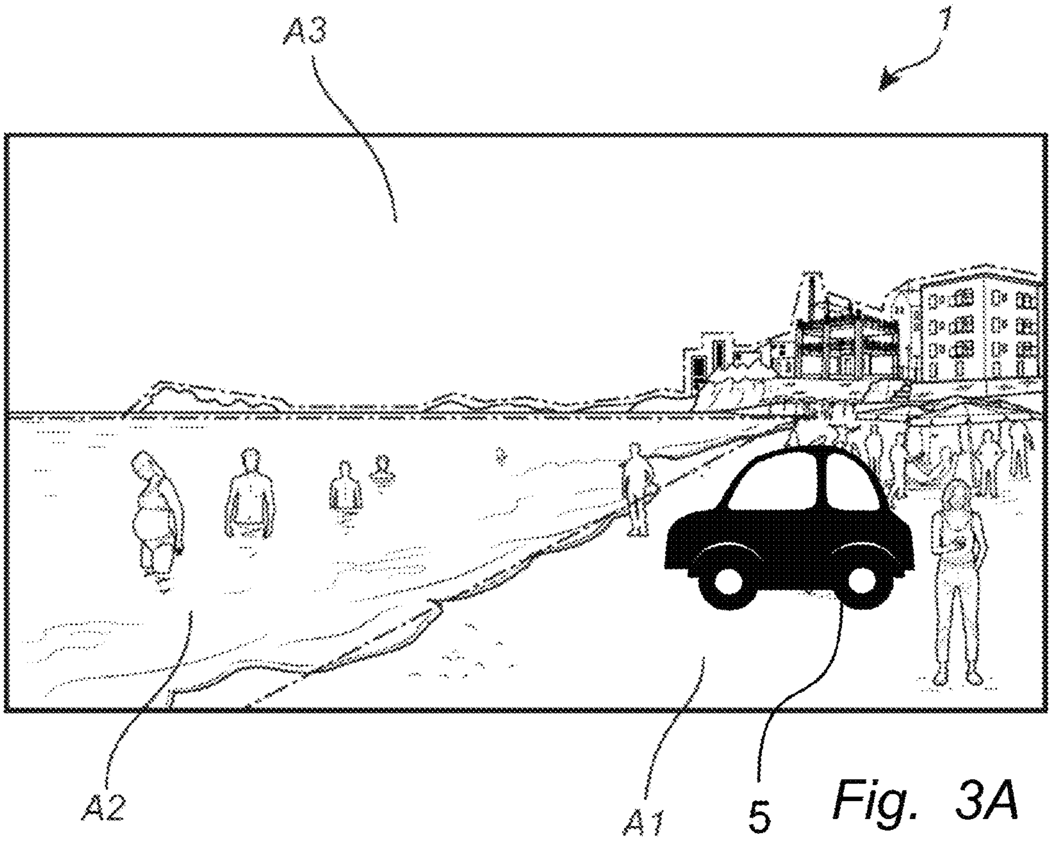
FIG. 3A is an illustration of a first image of the scene in FIG. 1, indicating a detected car on the beach.
Figure 3B:
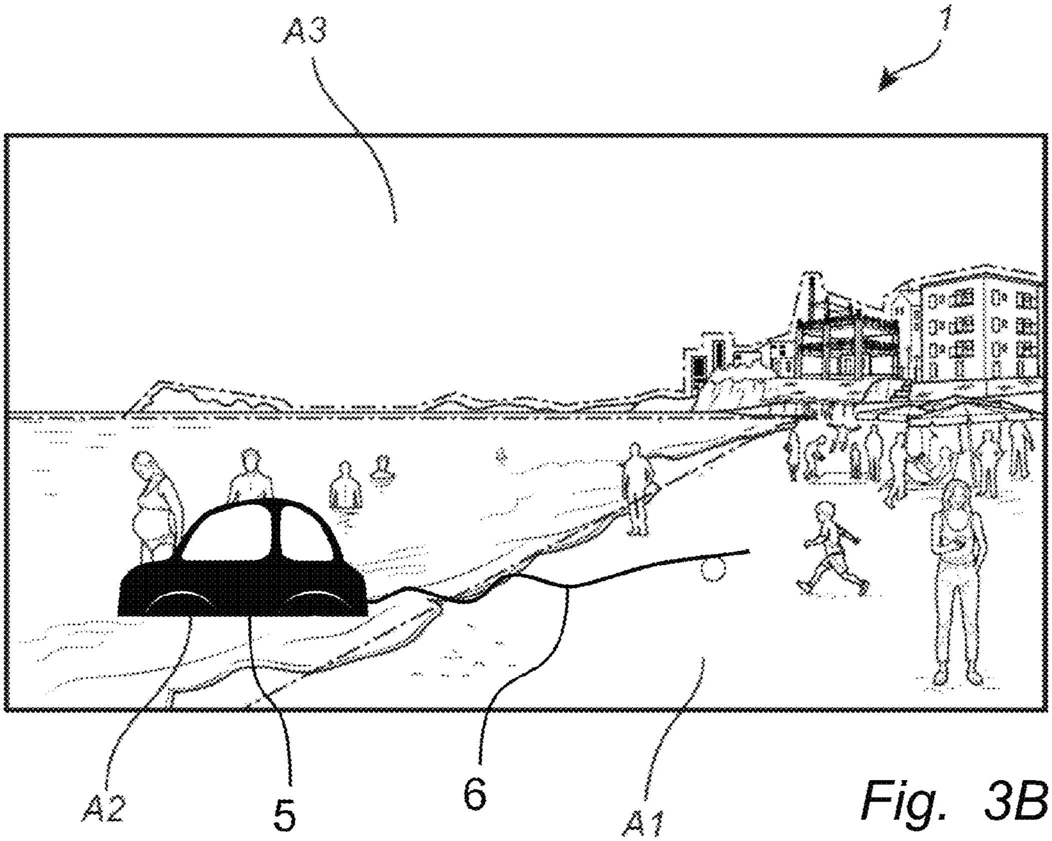
FIG. 3B is an illustration of a second image of the scene in FIG. 1, wherein the detected car has moved into the water.

The object detection thresholds Th1A1, Th2A2 set for the first and second scene areas A1, A2 may be general, in the sense that they apply to all objects of interest that are to be detected. However, it may in many situations be desirable to use different object detection thresholds for objects of different object classes. For instance, for each scene area A1, A2, A3, one object detection threshold may be set for detecting people and another object detection threshold may be set for detecting vehicles. This will now be explained with reference to FIGS. 2A, 2B, 3A, and 3B. In this variant of the object detection method, the objects of interest are associated with object classes. It may, for example, be useful to detect people and vehicles. The object classes could in such case be "person" and "vehicle". Possibly, an object class called "other" could also be used for labelling detected objects that are neither people nor vehicles. In other situations, it may be useful to detect different kinds of vehicles. The object classes could in such case be, e.g., “car”, “lorry”, “motorcycle” and “bicycle”. With reference again to FIGS. 2A and 2B, the first object detection threshold Th1A1 set for the land area A1 is in this variant set only for objects of a first object class, in this example the object class “person”, and the second object detection threshold Th2A2 set for the sea area A2 is also set only for objects of the object class “person”. With reference to FIGS. 3A and 3B, the same principle is used for setting object detection thresholds for detecting objects of a second object class, in this example the object class “vehicle”. Thus, a third object detection threshold Th3A1 is set for detecting objects of the object class “vehicle” in the land area A1. As may be seen in FIG. 3A, a car 5 can be found in the land area A1. The confidence value C3 for the detection of the car 5 is above the third object detection threshold Th3A1 for “vehicles” in the land area A1. The car 5 is tracked in subsequent images and as may be seen in FIG. 3B, the car has been driven into the water, i.e. into the sea area A2. The tracking is symbolised by the squiggly line 6 in FIG. 3B. A fourth confidence value C4 for an attempted object detection in the location of the car 5 in the sea area A2 is determined and a fourth object detection threshold Th4A2 for “vehicles” in the sea area A2 is set such that it is below the fourth confidence value C4. When the different object detection thresholds have been set, object detection is performed in subsequent images using the respective object detection thresholds for the different scene areas A1, A2 and for the different object classes.

It may be noted that object detection conditions need not vary in the same way between different scene areas for objects of all object classes. For instance, it may be easier to detect people on land than in the water, but it may be easier to detect a boat in the water than stranded or dragged up on land. Such differences may be due to the training of the object detectors. An object detector for detecting people may in many cases have been trained on people on land, whereas an object detector detecting boats may be expected to have been trained on boats on water. Therefore, it may be useful to start the object detection threshold setting process for objects of the object class “person” by setting an object detection threshold for the land area A1 and then track a detected person as it moves into the sea area A2, but for the object class “boat”, it may be better to start the object detection setting process by setting an object detection threshold for the sea area A2 and then track a detected boat as it moves into the land area A1.

The segmentation of the images may be performed on a first image and then used for all subsequent images. However, in many scenes, detection conditions are not constant, and it may therefore be advisable to perform a new segmentation now and then. A new segmentation may be useful if the scene has changed. Such change may be fairly predictable and regular, such as in an indoor scene where lights are on during working hours and off outside working hours, when leaves on shrubbery grow in the spring and fall off in the autumn, or when tidal water moves the water line on a beach, or they may be more unpredictable and unregular, such as when a large container is temporarily placed in the scene, casting a large shadow, or when lighting changes because of weather conditions. Thus, it may be useful to perform a new segmentation based on a trigger event. The trigger event may, for instance, be an elapsed time since a previous segmentation. A user may manually cause the trigger event by interaction with a user interface if the user thinks a new segmentation is necessary. In some scenarios, the trigger event may be based on automatic detection. For example, if automatic detection of lighting conditions in the scene is used, a change in lighting conditions may be a trigger event. A new segmentation could possibly be done for every image, but it will generally be more efficient to do it less frequently and then use the same segmentation for a plurality of images, until a new segmentation is motivated.

If object detection conditions in at least a part of the scene have changed, with or without a new segmentation, it may be useful to recalibrate the object detection thresholds, such that the rates of false positives and false negatives do not deteriorate unacceptably. The approach used for recalibration is the same as for the initial setting of the object detection thresholds. As with new segmentation, recalibration of object detection thresholds may be initiated by a trigger event. The trigger event could be manually activated, such as interaction with a user interface. The trigger event could alternatively be automatic, such as an elapsed time since the second object detection threshold was set. Trigger events could be regularly reoccurring, such that a recalibration is initiated at a certain time of day or time of year. A change in lighting conditions in the scene could also be automatically detected and generate a trigger event. In some scenarios, historical data could be used, such that a trigger event is generated when a frequency of object detections in the first or second scene area deviates from a historical range. If the number of object detections in a scene area falls or rises significantly, compared to what has historically been the case, this may be due to an actual change of the number of objects appearing in the scene, but it could also be caused by a change in object detection conditions. If a new segmentation has been performed, it will generally be necessary to also recalibrate the object detection thresholds. Still, even if the segmentation remains unchanged, object detection conditions may have changed to such an extent that a recalibration of thresholds is necessary. Such changes in object detection conditions may apply to the whole scene, such as when overall lighting conditions change, or they may apply to only one or some scene areas.

With the scene 2 in FIG. 1 as example, a later object (not shown) is detected in the land area A1 and tracked in a series of images, in the same way as was done for the first object 3 from its detection in the first image I1 to the second image I2. This new tracking will be used as ground truth for the detection of the later object in the sea area A2. An updated second confidence value C2U is determined for an object detection attempt in the location of the later object in the sea area A2. An updated second object detection threshold Th2UA2 for the sea area A2 is now set such that it is below the updated second confidence value C2U for the sea area A2. In subsequent images, the updated second object detection threshold Th2UA2 is used for detecting objects in the sea area A2.

Figure 4:
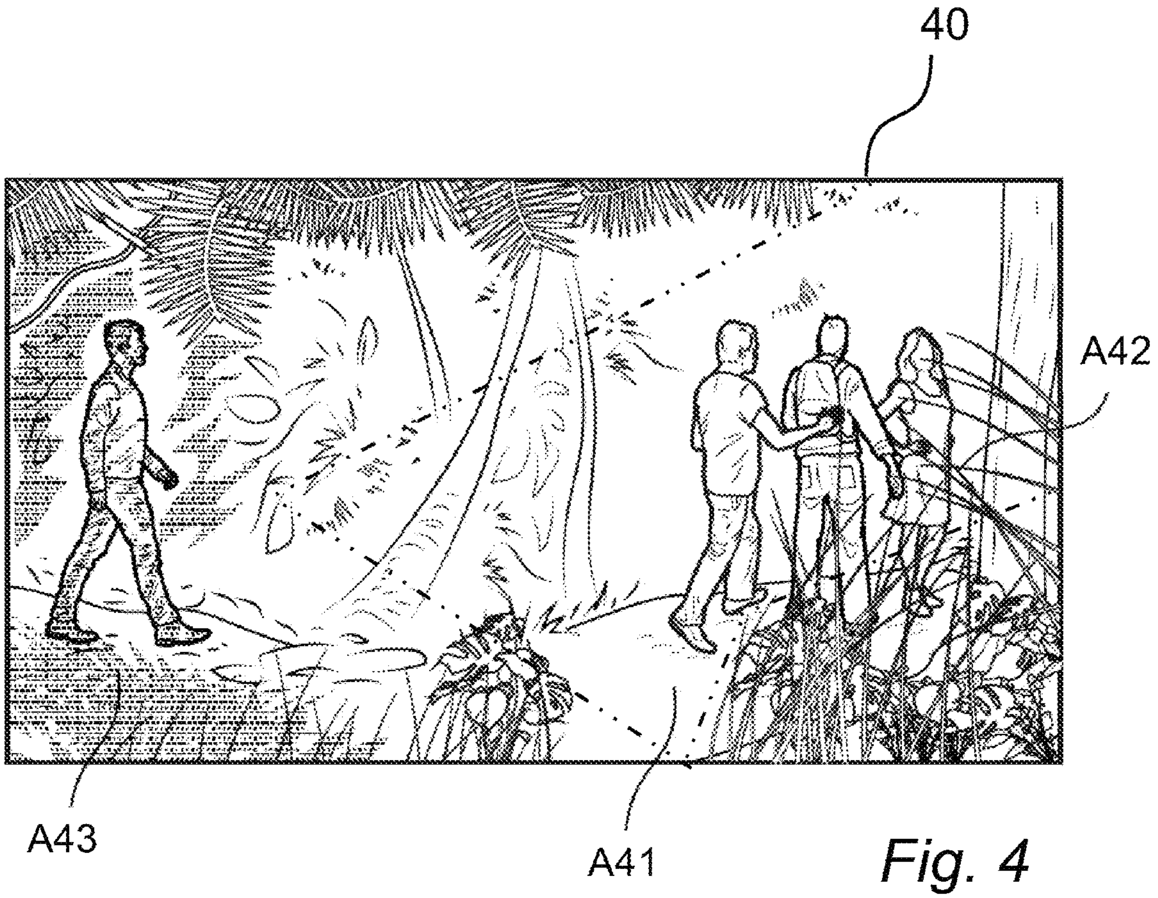
FIG. 4 is an illustration of an image of another scene.

Above, the invention has been described with the aid of an example scene in the form of a beach. The skilled person will realise that there are also many other types of scenes where object detection conditions differ from one scene area to another. In FIG. 4, another example of a scene 40 is shown. Here, the scene is a forest with a path, some foliage and a shadowed area. The method for detecting objects in images of this scene 40 is the same as has been described above. Thus, the forest scene 40 is segmented into different scene areas, in this case a path area A41, a foliage area A42, and a shadow area A43. Different from the scene 2 in FIG. 1, none of these scene areas A41, A42, A43 is a significantly unlikely detection area, like the sky area A3 in FIG. 1. Instead, the path area A41 may be seen as a scene area with good object detection conditions, and both the foliage area A42 and the shadow area A43 may be considered scene areas with more difficult object detection conditions, as persons and other objects may be partially obscured by the foliage and hard to detect in relative darkness or shifting light.

Again, it should be kept in mind that one and the same scene area need not necessarily have good or bad object detection conditions for objects of all object classes. Thus, it may be necessary to set different object detection thresholds for detecting objects of different object classes. It may also be necessary to start the object detection threshold setting process in different scene areas for objects of different classes, as discussed above. It will generally be more efficient to start by setting an object detection threshold for a scene area with good object detection conditions for the particular object class and then track a detected object as it moves into a scene area with more difficult object detection conditions for that object class. For the example scene shown in FIG. 4, an object detection threshold could first be set for the path area A41. An object detected there would then be tracked as it moves into the foliage area A42, and the tracking would be used as ground truth for setting an object detection threshold for the foliage area in the same way as described in relation to FIGS. 2A and 2B. Another object detected in the path area A41 would then be tracked as it moves into the shadow area A43, and this tracking would be used as ground truth for setting an object detection threshold for the shadow area A43 in the same manner.

Figure 5:
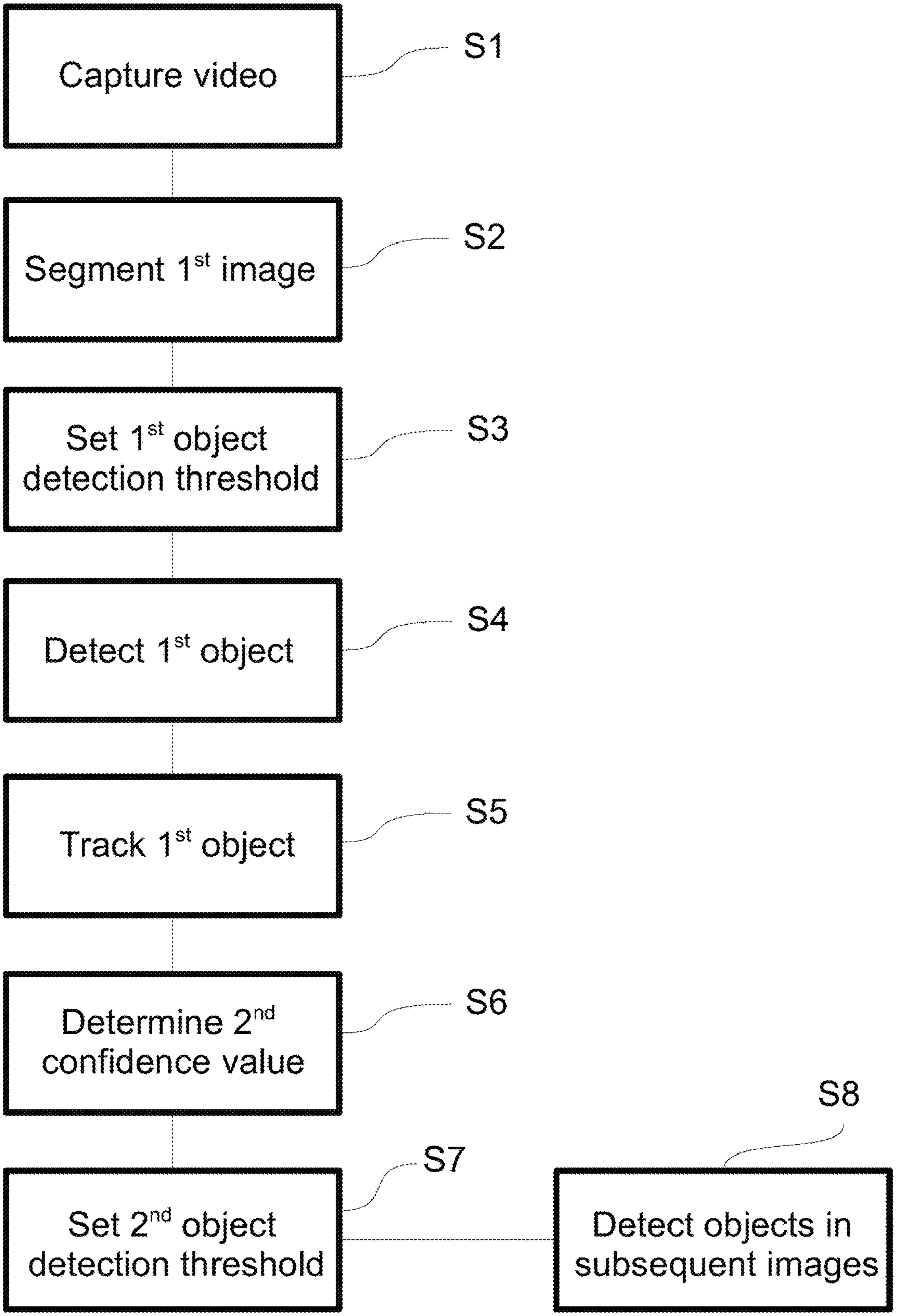
FIG. 5 is a flowchart of an object detection method.

With reference to FIG. 5, the inventive method will now be described in slightly more general terms. Video of a scene, such as the scenes shown in FIGS. 1 and 4, is captured (step S1). A first image in the video is segmented (step S2) into at least two different scene areas. The different scene areas have properties such that object detection conditions are expected to differ between the scene areas. A first object detection threshold is set (step S3) for detecting objects in the first scene area. Using the first object detection threshold, a first object is detected (step S4) in the first scene area in a first image. A first confidence value of the detection of the first object in the first scene area is above the first object detection threshold, or else it would not be output as an object detection. In a series of images subsequent to the first image, the first object is tracked as it moves into the second scene area. Object detection is performed in a second image in which the second object has moved into the second scene area and a second confidence value for such an attempted object detection in the known location of the second image is determined (step S6). A second object detection threshold is set (step S7) for object detection in the second scene area. The second object detection threshold is set such that the second confidence value is above the second object detection threshold. Thus, using the second object detection threshold, the second object would be detected in the second scene area in the second image. In subsequent images object detection is performed (step S8) using the first object detection threshold for detecting objects in the first scene area and using the second object detection threshold for detecting objects in the second scene area.

The object detection method may be used on live video, detecting objects in substantially real time. Alternatively or additionally, the object detection method may be performed on recorded video. Such video recordings may be done in the camera capturing the video or remotely from the camera, such as in a computer running a video management system to which the video is transmitted from the camera.

Figure 6:
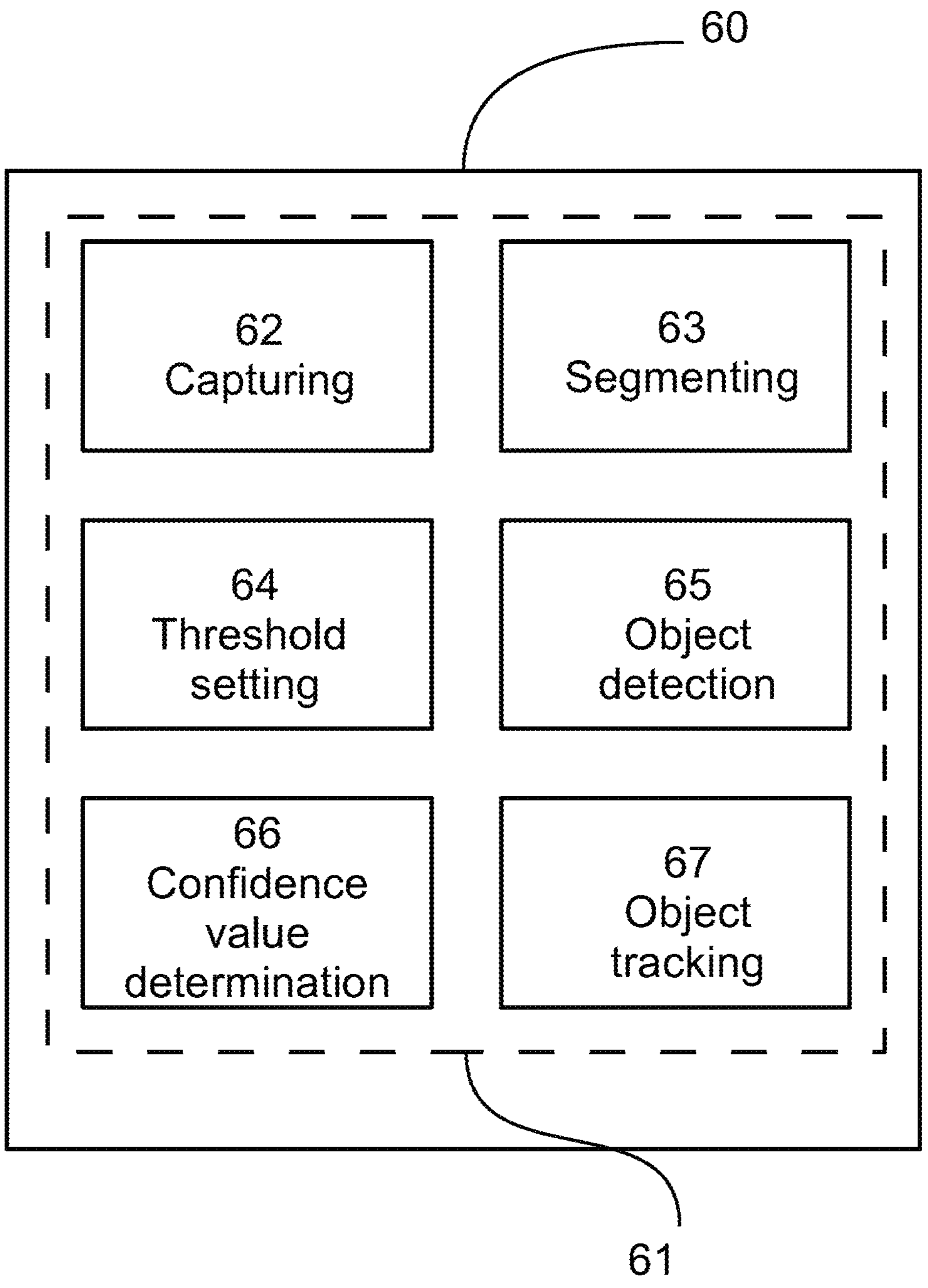
FIG. 6 is a box diagram of an object detection system.

Turning to FIG. 6, an object detection system for detecting objects in a scene captured by a camera will be described. The object detection system 60 is illustrated in a simplified form, describing only those parts of the object detection system that are relevant to the invention. The object detection system 60 comprises circuitry 61 configured to perform the functions necessary for the invention. Thus, the circuitry is configured to perform a capturing function 62, a segmenting function 63, a threshold setting function 64, an object detection function 65, a confidence value determination function 66, and an object tracking function 67.

The capturing function 62 is arranged to capture video of a scene, such as the scenes shown in FIGS. 1-4. The segmenting function 63 is arranged to segment a first image in the captured video into two or more scene areas, i.e. at least a first scene area and second scene area. The scene areas have properties such that object detection conditions can be expected to differ between the scene areas. The threshold setting function 64 is arranged to set thresholds for object detection in images of the video. The object detection function 65 is arranged to detect objects in images in the video. The confidence value determination function 66 is arranged to determine confidence values for object detections. The object tracking function 67 is arranged to track objects in images in the video.

For performing the invention, the threshold setting function is arranged to set a first object detection threshold for the first scene area. The object detection function is arranged to detect a first object in the first scene area in the first image, a first confidence value for the detection of the first object being above the first object detection threshold. The object tracking function is arranged to track the first object in a plurality of images subsequent to the first image, as it moves into the second scene area. The confidence value determination function is arranged to determine a second confidence value for a detection of the first object in the second scene area. The threshold setting function is arranged to set a second object detection threshold for the second scene area such that the second confidence value for the detection of the first object is above the second object detection threshold. For subsequent images, the object detection function is arranged to use the first object detection threshold for detecting objects in the first scene area and the second object detection threshold for detecting objects in the second scene area. The object detection system 60 may thus operate in line with the object detection method described above.

The object detection system 60 may be incorporated in a camera used for capturing the images in which object detection is to be performed. As an alternative, the object detection system 60 may be arranged as a separate device or as software in a general use computer. For instance, the object detection system 60 may be implemented in a computer also running a video management system to which images from a camera are transmitted.

The functions 62-67 of the object detection system 60 may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. In the disclosure, the circuitry is hardware that carries out or is programmed to perform the recited functionality. The hardware may be any hardware disclosed herein or otherwise known which is programmed or configured to carry out the recited functionality.

In a pure hardware implementation, each of the functions may have corresponding circuitry which is dedicated and specifically designed to implement the function. The circuitry may be in the form of one or more integrated circuits, such as one or more application specific integrated circuits or one or more field-programmable gate arrays.

In an implementation which also includes software, the circuitry may include a processor. Processors are considered processing circuitry or circuitry as they include transistors and other circuitry therein. In this case, the circuitry may be seen as a combination of hardware and software, the software being used to configure the hardware and/or processor.

It is to be understood that it is also possible to have a combination of a hardware and a software implementation, meaning that some of the functions are implemented by dedicated circuitry and others in software, i.e., in the form of computer code which is executed by a processor.

Figure 7:
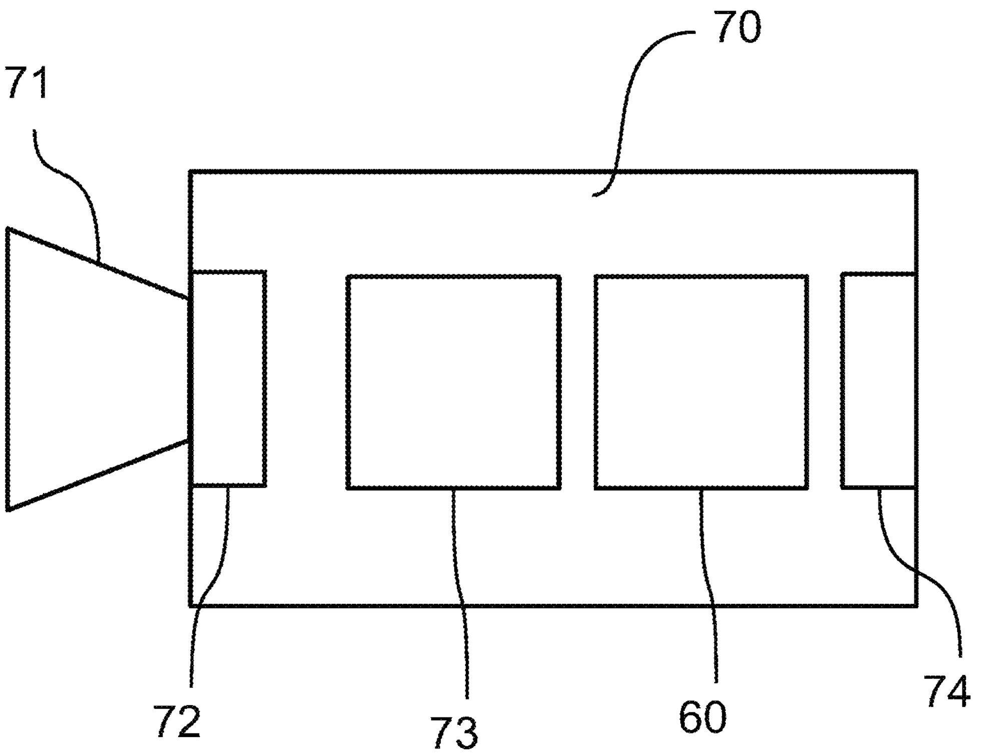
FIG. 7 is a box diagram of a camera incorporating an object detection system.

In FIG. 7, a camera 70 incorporating the object detection system 60 of FIG. 6 is shown. The camera 70 has a lens 71 and an image sensor 72 for capturing video of a scene. Further, the camera 70 includes image processing circuitry 73 for processing captured images, the object detection system 60 for detecting objects in the captured images, and a network interface 74 for transmitting video from the camera 70. As the skilled person will appreciate the, the camera 70 comprises additional components and functions, but these will not be discussed here as they are not necessary for understanding the invention. The object detection system 60 may operate in accordance with what has been described above. The object detection system 60 may be used for detecting objects in video captured by the camera. If the camera is operably connected to one or more other cameras, the object detection system may be use for detecting objects also in images captured by such other cameras.

It will be appreciated that a person skilled in the art can modify the above-described embodiments in many ways and still use the advantages of the invention as shown in the embodiments above. As an example, the segmentation has been described as being performed using a semantic segmentation neural network or algorithm. Such an automated segmentation is usually most effective, but there may be scenarios in which a manual segmentation is preferable.

In the description above, it has been assumed that a tracking algorithm or tracking device separate from the object detector is used. However, tracking may also be performed by the object detector working as a joint detector and tracker. In such case, the object detector will use different detection thresholds for different tasks. An object detection threshold may be used for determining if the object detector is sure enough that there is an object (or an object of a particular object class) for it to output an object detection for use by a user or by another algorithm An object tracking threshold may be used for determining if the object detector is sure enough that a new detection is likely the same as a previously detected objected and should therefore be added to the track. The object detection threshold may in these situations be higher than the object tracking threshold, such that only detections with a sufficiently high confidence value will be considered to be object detections but once an object has been detected, it will be tracked even if the confidence value falls below the object detection threshold. Only when the confidence value falls below also the object tracking threshold would the track be discontinued.

Tracking may also be performed with the help of re-identification using feature vectors of detected objects.

The invention has so far been described in a scenario where an object moves from a scene area with relatively good object detection conditions to a scene area with relatively bad object detection conditions, such as when a person moves from land into the water or when boat moves from the water up on land. This is a scenario in which one would risk missing objects that are easy to detect in a "good" scene area but more difficult to detect if they move into a "bad" scene area. However, the inventors foresee that the same principle can be used for setting or adjusting an object detection threshold for a "good" scene area. In such a scenario, the object detection threshold for the "good" scene area can be raised after tracking an object as it moves into the "good" scene area, thereby reducing a risk of false positives. With a reversal of the events in FIGS. 2A and 2B, if the person 3 is first detected in the water area A2 and then walks up on the beach, into the land area A1, a confidence value for the detection of the person 3 on land is determined. As an example, the confidence value may be determined to be 95% and the object detection threshold for the land area A1 may previously, e.g. as a default, have been set at 80%. It may in this example be seen that the object detection threshold for the land area may be unnecessarily low and it can therefore be raised to, e.g., 90%, thus reducing the risk of false positives.

As noted in the background section, object detection can be performed using various approaches. The invention has above been described in the context of machine learning or deep learning object detection, such as those that employ neural networks. Still, the invention may be applicable also to object detection algorithms based on feature detection, to the extent these algorithms use adjustable detection thresholds.

Thus, the invention should not be limited to the shown embodiments but should only be defined by the appended claims.

The invention claimed is:

1. A method for detecting objects in a scene captured by a camera, the method comprising:

capturing video of the scene, the video comprising a sequence of captured images, segmenting a first captured image in the video into at least a first scene area and a second scene area based at least in part on expected differences in object detection conditions between the first scene area and the second scene area, wherein the first and second scene areas having properties such that ease or difficulty of detecting objects is expected to differ between the first and second scene areas, setting a first object detection threshold for the first scene area, detecting a first object in the first scene area in the first captured image, a first confidence value for the detection of the first object being above the first object detection threshold, in a plurality of captured images subsequent to the first image in the sequence, tracking the first object as it moves into the second scene area, determining a second confidence value for a detection of the first object in the second scene area, setting a second object detection threshold for the second scene area such that the second confidence value for the detection of the first object is above the second object detection threshold, and in subsequent images, using the first object detection threshold for detecting objects in the first scene area and the second object detection threshold for detecting objects in the second scene area.

2. A method for detecting objects in a scene captured by a camera, the method comprising:

capturing video of the scene, segmenting a first image in the video into at least a first scene area and a second scene area, the first and second scene areas having properties such that ease or difficulty of detecting objects is expected to differ between the first and second scene areas, setting a first object detection threshold for the first scene area, detecting a first object in the first scene area in the first image, a first confidence value for the detection of the first object being above the first object detection threshold, in a plurality of images subsequent to the first image, tracking the first object as it moves into the second scene area, determining a second confidence value for a detection of the first object in the second scene area, setting a second object detection threshold for the second scene area such that the second confidence value for the detection of the first object is above the second object detection threshold, and in subsequent images, using the first object detection threshold for detecting objects in the first scene area and the second object detection threshold for detecting objects in the second scene area; wherein:

the first object is associated with a first object class, the method further comprising:

setting the first object detection threshold for the first scene area comprises setting a first object detection threshold for objects of the first object class in the first scene area, and setting the second object detection threshold comprises setting a second object detection threshold for objects of the first object class in the second scene area.

3. The method according to claim 2, further comprising:

setting a third object detection threshold for detecting objects of a second object class in the first scene area, detecting a second object in the first scene area in a second image, wherein the second object is associated with a second object class and wherein a third confidence value for the detection of the second object is above the third object detection threshold, in a plurality of images subsequent to the first image, tracking the second object as it moves into the second scene area, determining a fourth confidence value for a detection of the second object in the second scene area, setting a fourth object detection threshold for the second scene area such that the fourth confidence value for the detection of the second object is above the fourth object detection threshold, and in subsequent images, using the first object detection threshold for detecting objects of the first object class in the first scene area and the second object detection threshold for detecting objects of the first object class in the second scene area, and using the third object detection threshold for detecting objects of the second object class in the first scene area and the fourth object detection threshold for detecting objects of the second object class in the second scene area.

4. A method for detecting objects in a scene captured by a camera, the method comprising:

capturing video of the scene, segmenting a first image in the video into at least a first scene area and a second scene area, the first and second scene areas having properties such that ease or difficulty of detecting objects is expected to differ between the first and second scene areas, setting a first object detection threshold for the first scene area, detecting a first object in the first scene area in the first image, a first confidence value for the detection of the first object being above the first object detection threshold, in a plurality of images subsequent to the first image, tracking the first object as it moves into the second scene area, determining a second confidence value for a detection of the first object in the second scene area, setting a second object detection threshold for the second scene area such that the second confidence value for the detection of the first object is above the second object detection threshold, and in subsequent images, using the first object detection threshold for detecting objects in the first scene area and the second object detection threshold for detecting objects in the second scene area;

the method further comprising performing a new segmentation of a later image subsequent to the first image based on a trigger event.

5. The method according to claim 4, wherein the trigger event is one of user input, an elapsed time since the second object detection threshold was set, a frequency of object detections in the first or second scene area deviating from a historical range, a time of day, a time of year, or a change in lighting conditions in the scene.

6. A method for detecting objects in a scene captured by a camera, the method comprising:

capturing video of the scene, segmenting a first image in the video into at least a first scene area and a second scene area, the first and second scene areas having properties such that ease or difficulty of detecting objects is expected to differ between the first and second scene areas, setting a first object detection threshold for the first scene area, detecting a first object in the first scene area in the first image, a first confidence value for the detection of the first object being above the first object detection threshold, in a plurality of images subsequent to the first image, tracking the first object as it moves into the second scene area, determining a second confidence value for a detection of the first object in the second scene area, setting a second object detection threshold for the second scene area such that the second confidence value for the detection of the first object is above the second object detection threshold, and in subsequent images, using the first object detection threshold for detecting objects in the first scene area and the second object detection threshold for detecting objects in the second scene area;

the method further comprising performing a new tracking of a later object in images subsequent to the first image based on a trigger event, determining an updated second confidence value for a detection of the later object in the second scene area, setting an updated second object detection threshold for the second scene area such that the updated second confidence value for the detection of the later object is above the updated second object detection threshold, and in images subsequent to the later image, using the first object detection threshold for detecting objects in the first scene area and the updated second object detection threshold for detecting objects in the second scene area.

7. A method for detecting objects in a scene captured by a camera, the method comprising:

capturing video of the scene, segmenting a first image in the video into at least a first scene area and a second scene area, the first and second scene areas having properties such that ease or difficulty of detecting objects is expected to differ between the first and second scene areas, setting a first object detection threshold for the first scene area, detecting a first object in the first scene area in the first image, a first confidence value for the detection of the first object being above the first object detection threshold, in a plurality of images subsequent to the first image, tracking the first object as it moves into the second scene area, determining a second confidence value for a detection of the first object in the second scene area, setting a second object detection threshold for the second scene area such that the second confidence value for the detection of the first object is above the second object detection threshold, and in subsequent images, using the first object detection threshold for detecting objects in the first scene area and the second object detection threshold for detecting objects in the second scene area;

wherein the step of segmenting is performed using a semantic segmentation algorithm.

8. An object detection system for detecting objects in a scene captured by a camera, the system comprising:

a memory that stored the scene captured by the camera; and a processor, coupled to the memory, and configured to:

capture video of the scene, the video comprising a sequence of captured images, segment a first captured image in the video into at least a first scene area and a second scene area based at least in part on expected differences in object detection conditions between the first scene area and the second scene area, wherein the first and second scene areas having properties such that ease or difficulty of detecting objects is expected to differ between the first and second scene areas, set thresholds for object detections in images in the video, detect objects in images in the video, determine confidence values for object detections, and track objects in images in the video, wherein processor is further configured to:

set a first object detection threshold for the first scene area, detect a first object in the first scene area in the first captured image, a first confidence value for the detection of the first object being above the first object detection threshold, track the first object in a plurality of images subsequent to the first image, as it moves into the second scene area, determine a second confidence value for a detection of the first object in the second scene area, set a second object detection threshold for the second scene area such that the second confidence value for the detection of the first object is above the second object detection threshold, and use the first object detection threshold for detecting objects in the first scene area and the second object detection threshold for detecting objects in the second scene area in subsequent images.

9. An object detection system for detecting objects in a scene captured by a camera, the system comprising:

a non-transitory computer-readable storage medium; and a processor, coupled to the non-transitory computer-readable storage medium, and configured to:

capture video of the scene, segment a first image in the video into at least a first scene area and a second scene area, the first and second scene areas having properties such that ease or difficulty of detecting objects is expected to differ between the first and second scene areas, set thresholds for object detections in images in the video, detect objects in images in the video, determine confidence values for object detections, and track objects in images in the video, set a first object detection threshold for the first scene area, detect a first object in the first scene area in the first image, a first confidence value for the detection of the first object being above the first object detection threshold, track the first object in a plurality of images subsequent to the first image, as it moves into the second scene area, determine a second confidence value for a detection of the first object in the second scene area, set a second object detection threshold for the second scene area such that the second confidence value for the detection of the first object is above the second object detection threshold, and use the first object detection threshold for detecting objects in the first scene area and the second object detection threshold for detecting objects in the second scene area in subsequent images; wherein the processor is further configured to:

determine an object class of detected objects, the first object being associated with a first object class, and set the first object detection threshold for objects of the first object class in the first scene area, and to set the second object detection threshold for objects of the first object class in the second scene area.

10. A non-transitory computer-readable storage medium comprising instructions which, when executed by a device with processing capability, cause the device to carry out a method for detecting objects in a scene captured by a camera, the method comprising:

capturing video of the scene, the video comprising a sequence of captured images, segmenting a first captured image in the video into at least a first scene area and a second scene area based at least in part on expected differences in object detection conditions between the first scene area and the second scene area, wherein the first and second scene areas having properties such that ease or difficulty of detecting objects is expected to differ between the first and second scene areas, setting a first object detection threshold for the first scene area, detecting a first object in the first scene area in the first image, a first confidence value for the detection of the first object being above the first object detection threshold, in a plurality of captured images subsequent to the first image, tracking the first object as it moves into the second scene area, determining a second confidence value for a detection of the first object in the second scene area, setting a second object detection threshold for the second scene area such that the second confidence value for the detection of the first object is above the second object detection threshold, and in subsequent images, using the first object detection threshold for detecting objects in the first scene area and the second object detection threshold for detecting objects in the second scene area.

* * * * *